L. H. DUKE.
FERTILIZER DISTRIBUTER.
APPLICATION FILED APR. 21, 1914.
1,173,937.
Patented Feb. 29, 1916.
2 SHEETS—SHEET 2.
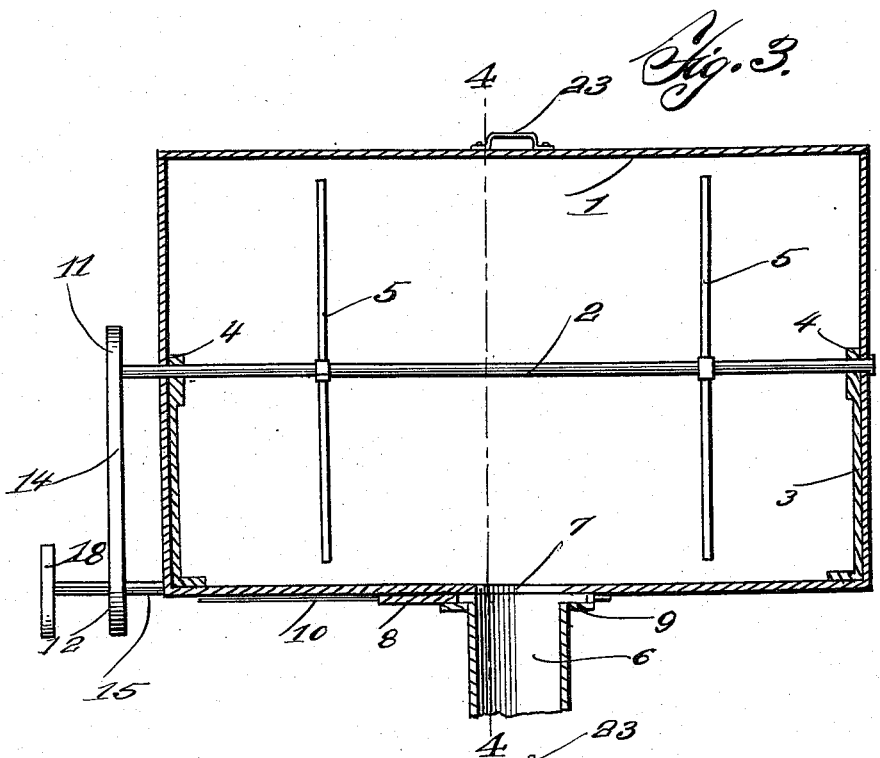
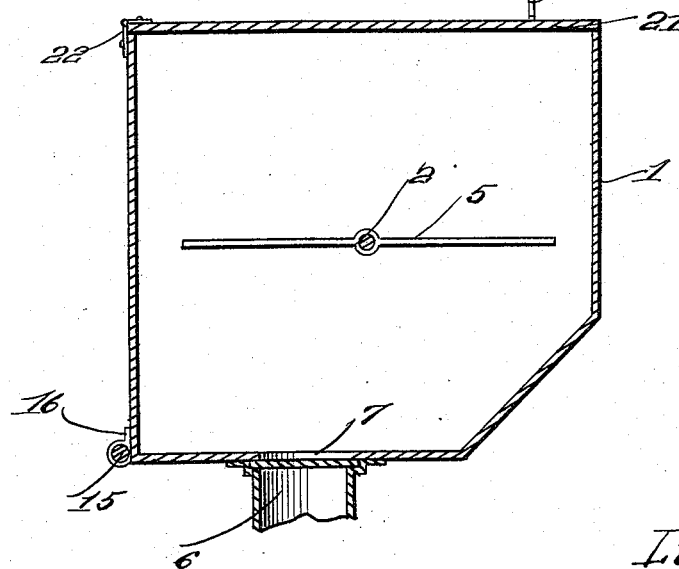

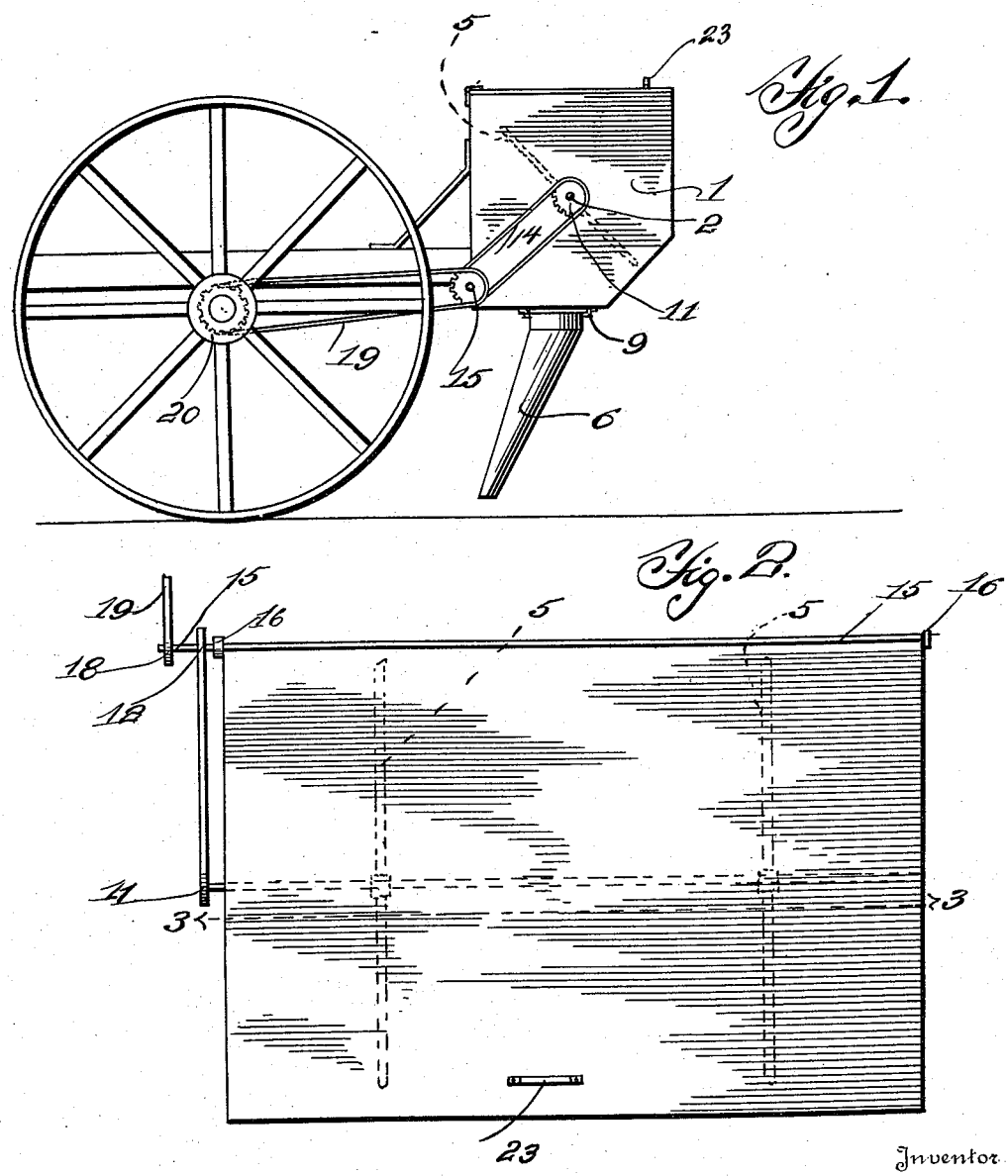

UNITED STATES PATENT OFFICE.

LUTHER H. DUKE, OF SABANNO, TEXAS.

FERTILIZER-DISTRIBUTER.

1,173,937.   Specification of Letters Patent.   Patented Feb. 29, 1916.

Application filed April 21, 1914. Serial No. 833,554.

*To all whom it may concern:*

Be it known that I, LUTHER H. DUKE, a citizen of the United States, residing at Sabanno, in the county of Eastland and State of Texas, have invented certain new and useful Improvements in Fertilizer-Distributers, of which the following is a specification.

This invention relates to improvements in devices for distributing fertilizer over the surface of a field which is to be planted with any suitable type of grain, and the primary object of the invention is the provision of a device as specified which is provided with suitable mechanism for efficiently distributing fertilizer such as barn-yard manure, decomposed straw or various other products of a barn such as are used for the purpose of fertilizing the soil preparatory for immediately after the planting of grain therein.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:

Figure 1 is a side elevation of the improved fertilizer spreader. Fig. 2 is a top plan view. Fig. 3 is a sectional view on the line 3—3 of Fig. 2, and Fig. 4 is a cross sectional view on the line 4—4 of Fig. 3.

Referring more particularly to the drawings, 1 designates the container or hopper, which is constructed of any suitable material and has a shaft 2 extending transversely therethrough and journaled in the sides of the hopper, being supported by suitable braces 3, which braces are mounted interiorly of the hopper and have bearings 4 formed upon their upper terminal ends.

The shaft 2 has mounted thereupon at spaced intervals, and internally of the hopper 1 agitating rods 5, which rods are rigidly mounted upon the shaft 2 so as to rotate in unison therewith, and they are provided for the purpose of agitating the manure or fertilizer when the same is positioned within the hopper, to render the same in a condition to be fed outwardly through the spout 6 upon the ground (not shown) over which the fertilizer is passing.

The spout 6 is attached to the bottom of the hopper 1 in any suitable manner, and it extends downwardly therefrom having its lower end of reduced diameter with respect to the upper end and positioned for properly depositing the fertilizer in rows, and when the fertilizing device is attached to seeders or planters, for depositing the fertilizer in rows or hills in which the grain is planted. The communicating opening 7 between the hopper 1 and the spout 6 is controlled by a plate 8, which is slidably mounted in the guide-way 9 formed upon the upper end of the spout 6, and the plate 8 is manipulated by a rod 10, which rod extends along the under surface of the hopper 1 to a position for convenient manual operation.

The shaft 2 protrudes beyond the outer surface of one end of the hopper 1 and it has mounted thereupon a sprocket wheel 11, which sprocket wheel has communication with a second sprocket wheel 12 by a sprocket chain 14. The sprocket chain 12 is mounted upon a shaft 15, which shaft extends longitudinally along one side of the hopper 1 near the lower end of the same and is supported adjacent the corner of the hopper by the brackets 16, which brackets are secured to the hopper in any suitable manner. The sprocket 18, which is mounted upon the outer end of the shaft 15 has a sprocket chain 19 passing thereabout, which sprocket chain passes about a sprocket 20 which is mounted upon the main driving axle of the agricultural implement as is clearly shown in Fig. 1 of the drawings.

The hopper 1 has a cover 21 hingedly connected thereto as at 22, so as to permit of the insertion of the fertilizer into the hopper, and a handle 23 is attached to the cover 21 to facilitate the opening or closing of the same.

The hopper 1 may be attached to any suitable type of seed drilling machine if it is so desired, or it may be used upon an independent traction structure, this feature being regulated by the manufacturer or user of the device.

When in use; the fertilizer is put within the hopper 1, through the medium of the cover 21 and upon the traction of the supporting traction structure, the shaft 2 will be rotated, which will in turn rotate the agitating rods 5 causing them to stir up or tend to pulverize the fertilizer within the hopper and also insure of the same passing outwardly through the opening 7 and the spout 6 for depositing upon the ground the fertilizer.

In reducing the invention to practice certain minor features of construction, combination and arrangement of parts may necessitate alterations to which the patentee is entitled provided such alterations are comprehended within the scope of what is claimed.

What is claimed is:—

A fertilizer distributer comprising a front wall, means for securing said front wall to a planter, side walls formed on said front wall, an inclined rear wall secured to said side walls, a top hinged to said front wall, a bottom formed on said walls and provided with a central opening therein, a spout secured to said bottom wall in registration with the opening therein, guide ways formed on said spout, a door slidably mounted on said guide ways adapted to open and close said spout, braces secured to the side walls and provided with their lower ends bent at right angles to conform with the bottom wall and rest thereon, a shaft journaled in the upper end of said braces, and in said side walls, a plurality of arms mounted on said shaft adapted to come in close contact with the inclined rear wall so as to agitate the fertilizer within said walls and means for rotating said shaft.

In testimony whereof I affix my signature in presence of two witnesses.

LUTHER H. DUKE.

Witnesses:
S. F. BOND,
C. C. NEEB.

Copies of this patent may be obtained for five cents each, by addressing the "Commissioner of Patents, Washington, D. C."